United States Patent [19]

Marucci et al.

[11] 3,750,034
[45] July 31, 1973

[54] SYSTEM FOR DETERMINING WHETHER A SIGNAL LIES WITHIN A SELECTED FREQUENCY BAND

[75] Inventors: Ronald R. Marucci, East Northport; Santo C. Galatioto, Richmond Hill, both of N.Y.

[73] Assignee: Hazeltine Corporation, Greenlawn, N.Y.

[22] Filed: May 28, 1971

[21] Appl. No.: 147,908

[52] U.S. Cl. ................................ 328/110, 328/140
[51] Int. Cl. .................................... H03k 5/20
[58] Field of Search ................ 307/233; 328/140, 328/109, 110, 138

[56] References Cited
UNITED STATES PATENTS
3,585,400  6/1971  Brayton .......................... 307/233
3,280,937  10/1966  Faber, Jr. et al. ............... 307/233

Primary Examiner—Benjamin A. Borchelt
Assistant Examiner—A. M. Psitos
Attorney—Edward A. Onders

[57] ABSTRACT

Disclosed is a system for receiving and detecting propagated mechanical-wave analog signals in which the analog signals are converted to a digital signal wherein pulse spacing is proportional to the corresponding instantaneous frequency of the detected mechanical wave signals. A digital processor compares the pulse-spacing of successive pulses of the incoming digital signal with selected pulse-spacing limits corresponding to the frequency limits of the selected bandwidth, and an output signal is generated indicating the receipt of analog signals within the selected frequency band whenever all of the successive pulses during a sampling interval lie within the selected pulse-spacing limits. Generation of an output signal is inhibited when any pair of successive pulses has a pulse spacing outside of the pulse-spacing limits during the sampling interval.

6 Claims, 4 Drawing Figures

SYSTEM FOR DETERMINING WHETHER A SIGNAL LIES WITHIN A SELECTED FREQUENCY BAND

BACKGROUND OF THE INVENTION

This invention relates to systems for receiving and detecting propagated mechanical wave analog signals lying within a selected band of frequencies. This invention was made in the course of a contract with the Department of the Navy.

Prior art mechanical wave signal detection systems, especially acoustic detection systems, have traditionally used analog methods in attempting to reliably detect propagated mechanical wave signals lying within a selected frequency band or propagated from a specific source such as a particular type of vehicle. These systems, however, have been hampered by high false alarm rates caused by the detection of spurious signals occurring within the selected band, such as may be generated by wind, thus resulting in a low operational reliability for the system.

SUMMARY OF THE INVENTION

It is therefore an object of this invention to provide a system for receiving and detecting propagated mechanical wave analog signals lying within a selected band of frequencies, which system has a lower probability of false alarm and a higher operational reliability than prior art analog systems.

It is another object of the present invention to provide novel digital signal processing apparatus for use in such a receiving and detecting system.

In accordance with the present invention there is provided a system for receiving and detecting propagated mechanical wave analog signals lying within a selected band of frequencies comprising a transducer means, for receiving the mechanical wave analog signals and converting those signals into an electrical analog signal representative of said mechanical signals and conversion means for converting the electrical analog signal to a digital signal representative of said electrical analog signal. The digital signal has an instantaneous pulse repetition rate (PRR) proportional to the instantaneous frequency of the detected mechanical wave signals. The system further includes a digital signal processing means for examining the instantaneous PRR of the digital signal during periodic sampling intervals and for generating an output signal at the completion of each sampling interval only if the PRR of the digital signal has not exceeded predetermined upper and lower PRR limits during the sampling interval. The upper and lower PRR limits correspond to the upper and lower frequency limits respectively of the selected band. The existence of the output signal generated by the processor indicates the detection of mechanical wave analog signals within the selected frequency band during the corresponding sampling interval.

For a better understanding of the present invention, together with other and further objects thereof, reference is had to the following description, taken in conjunction with the accompanying drawings, while its scope will be pointed out in the appended claims.

DESCRIPTION OF THE INVENTION

Figure 1:
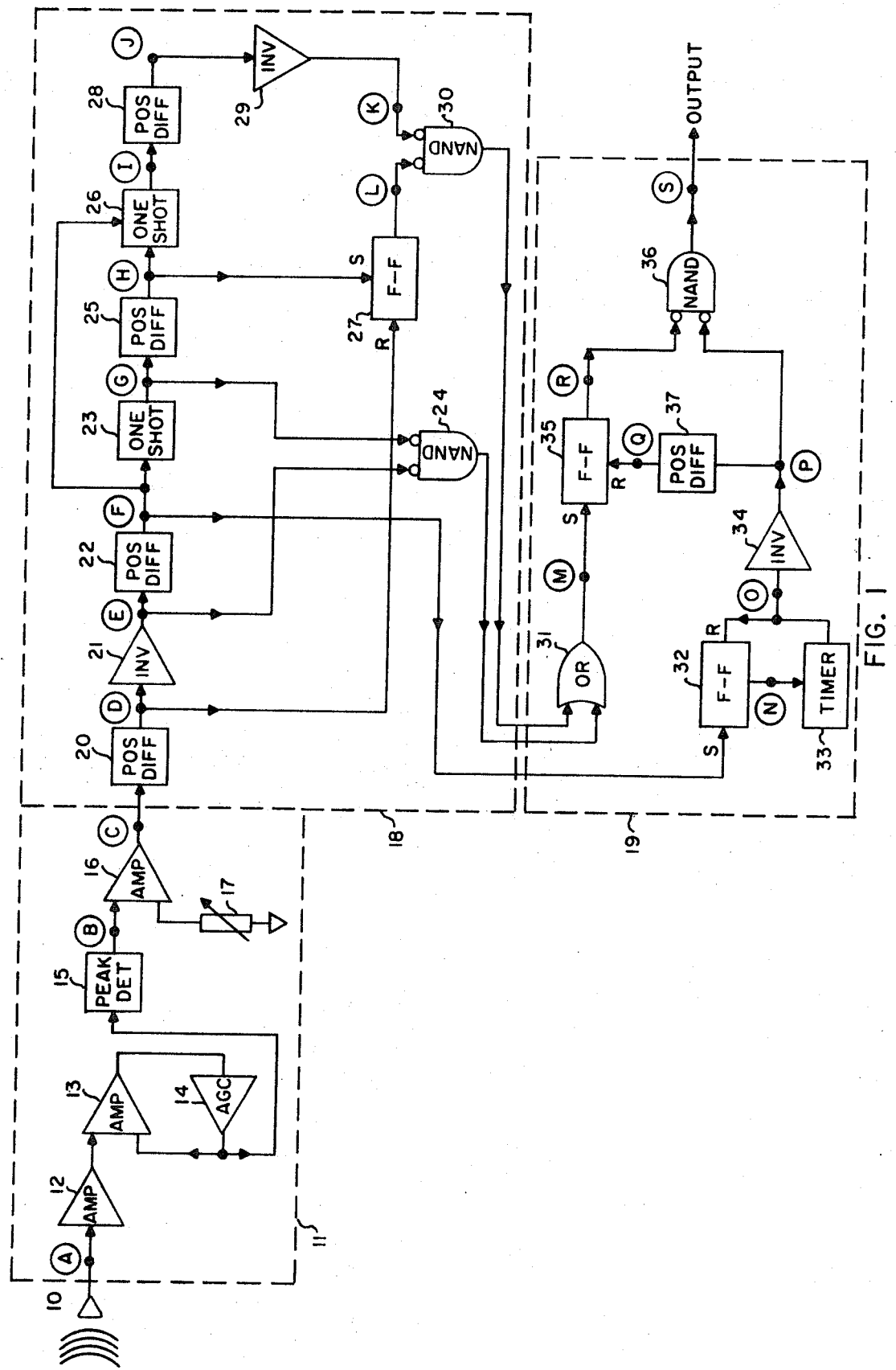
FIG. 1 is a block diagram of an acoustic signal receiving and detection system constructed in accordance with the present invention.

One embodiment of a system for receiving and detecting propagated mechanical wave analog signals lying within a selected band of frequencies is illustrated in FIG. 1 which shows an acoustic detection system for receiving and detecting acoustic signals lying within a selected frequency band. The system includes a transducer means, illustrated as microphone 10, for receiving the acoustic signals and converting the signals into an electrical analog signal representative of the acoustic signals. The microphone is coupled to an analog-to-digital signal conversion means 11, which converts the electrical analog signal into a digital signal which is representative of the analog signal and whose instantaneous PRR is proportional to the corresponding instantaneous frequency of the received acoustic signals. The conversion means includes a preamplifier 12, linear amplifier 13, and an AGC amplifier 14 coupled in series. The AGC amplifier is connected to the linear amplifier 13 and to a peak detector 15. The output of the peak detector and a threshold adjuster 17 are coupled to a differential amplifier 16.

The analog-to-digital conversion means 11 is coupled to a digital signal processing means which examines the instantaneous PRR of the digital signal by examining the pulse-spacing of successive pulses of the digital signal supplied by conversion means 11 during periodic sampling intervals, and generates an output signal at the completion of each of the sampling intervals only if the pulse-spacing of successive pulses of the digital signal has not exceeded predetermined upper and lower spacing limits during the sampling interval. These upper and lower spacing limits correspond to the upper and lower frequency limits of the selected band, the upper spacing limit being the minimum spacing permissible between successive pulses and the lower spacing limit being the maximum spacing permissible between sucessive pulses.

The digital signal processing means comprises comparison means 18 and indicating means 19. The comparison means 18 includes positive differentiator 20 coupled to inverter 21 which is, in turn, coupled to another positive differentiator 22. Differentiator 22 is coupled to a first one-shot circuit 23, which is responsive to the pulses of the digital signal and generates a first gating signal of a predetermined duration which corresponds to the upper pulse spacing limit previously mentioned. One-shot circuit 23 and inverter 21 are coupled to a coincidence circuit illustrated in FIG. 1 as NAND circuit 24. One-shot circuit 23 is also coupled to positive differentiator 25 which is coupled to a second one-shot circuit 26 and the set terminal of a flip-flop 27. Second one-shot circuit 26 which has an additional reset input from positive differentiator 22, generates a second gating signal of a predetermined duration which, in combination with the duration of said first gating signal, corresponds to the lower pulse-spacing limit previously mentioned. One-shot circuit 26 is coupled to the series combination of positive differentiator 28 and inverter 29. Flip-flop 27, whose reset terminal is coupled to differentiator 20, and inverter 29 are coupled to a coincidence circuit illustrated as NAND circuit 30. NAND circuit 24 is responsive to both the digital signal and the first gating signal, and NAND circuit 30 is responsive to the first gating signal and the second gating signal. A first signal is generated by NAND circuit 24 whenever the second of a pair of successive pulses of the digital signal falls within the duration of the first gating signal, and a second signal is generated by NAND circuit 30 whenever the second of a pair of successive pulses falls outside the combined duration of the first and second gating signals.

Indicating means 19 includes flip-flop 32, whose set terminal is connected to positive differentiator 22 and whose output is coupled to a timer 33. The output of timer 33 is coupled through a feed-back loop to the reset terminal of flip-flop 32 and also directly to an inverter 34. The resulting output signal from inverter 34 is a periodic sampling signal.

Indicating means 19 includes an OR gate 31 having its inputs coupled to the outputs of NAND gates 24 and 30 in comparison means 18. The output of OR gate 31 is coupled to the set terminal of flip-flop 35, whose output is, in turn, coupled to the inhibit terminal of NAND gate 36. Inverter 34 is coupled to a positive differentiator 37 which is coupled to the reset terminal of flip-flop 35. The output of inverter 34 is also coupled to another input of NAND gate 36. The NAND logic gate 36 is responsive to the periodic sampling signal from inverter 34 and the first and second signals generated by the NAND gates 24 and 30, and is inhibited from producing an output signal indicating the receipt of acoustic signal lying within the selected band whenever either of said first or second signals is generated during the sampling period. Conversely, NAND gate 36 will produce an output signal at the completion of each sampling interval whenever no first or second signal is generated within the sampling interval.

OPERATION OF THE INVENTION

Figure 2:
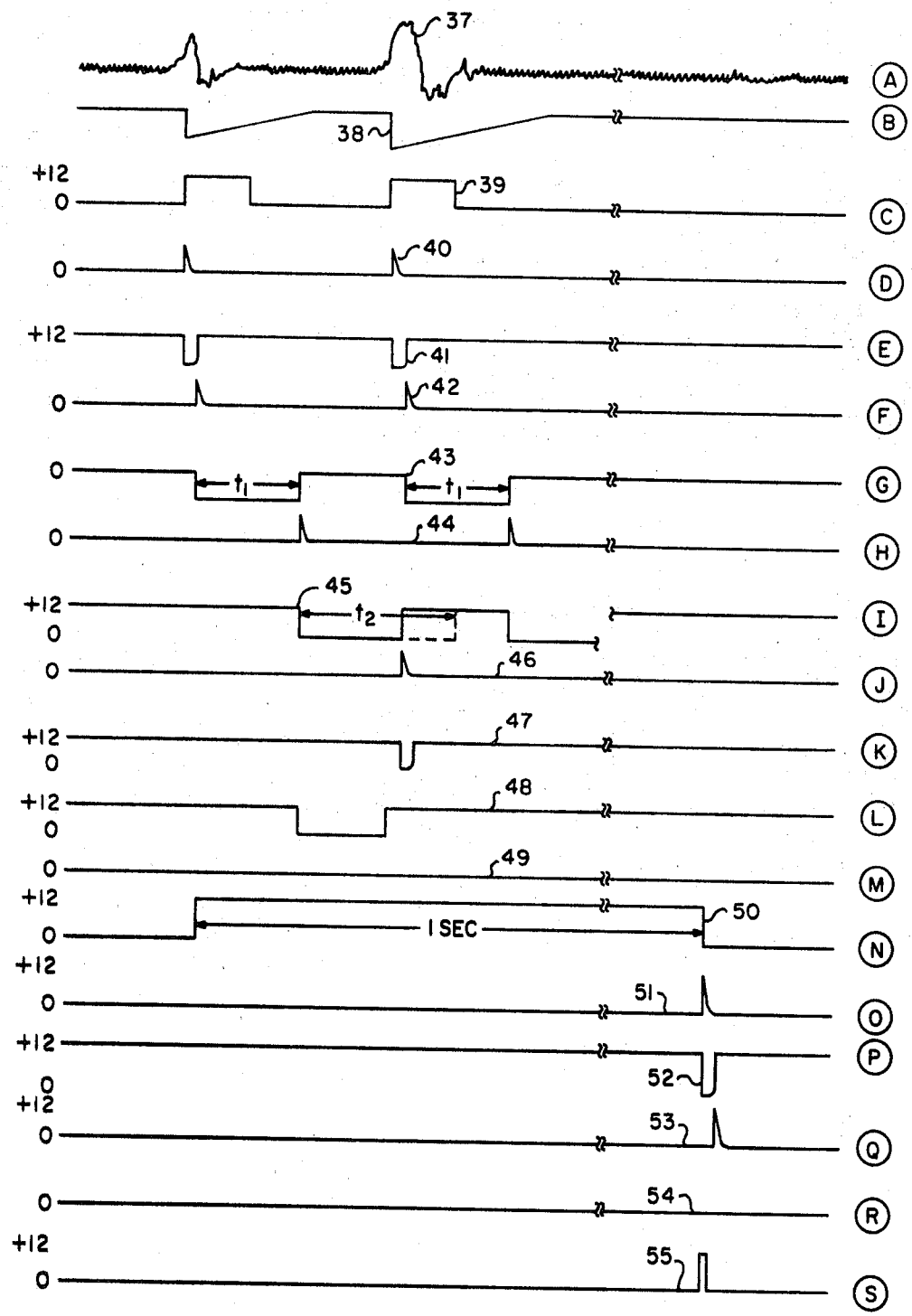
FIG. 2 is a signal timing diagram for the system of FIG. 1 illustrating the reception of acoustic signals lying within the selected frequency band.
Figure 3:
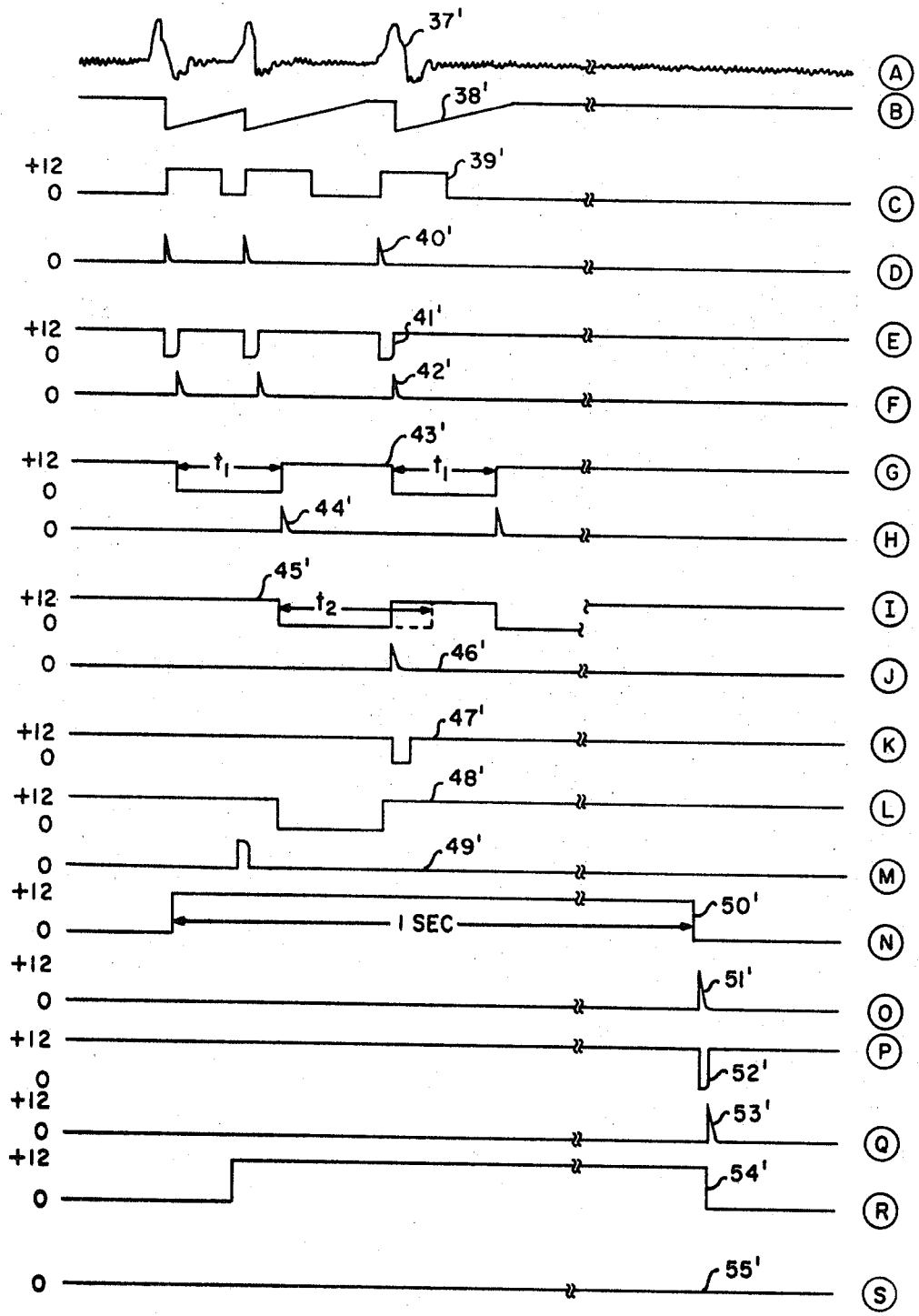
FIG. 3 is a signal timing diagram for the system of FIG. 1 in which the received signals lie above the upper frequency limit of the selected frequency band.
Figure 4:
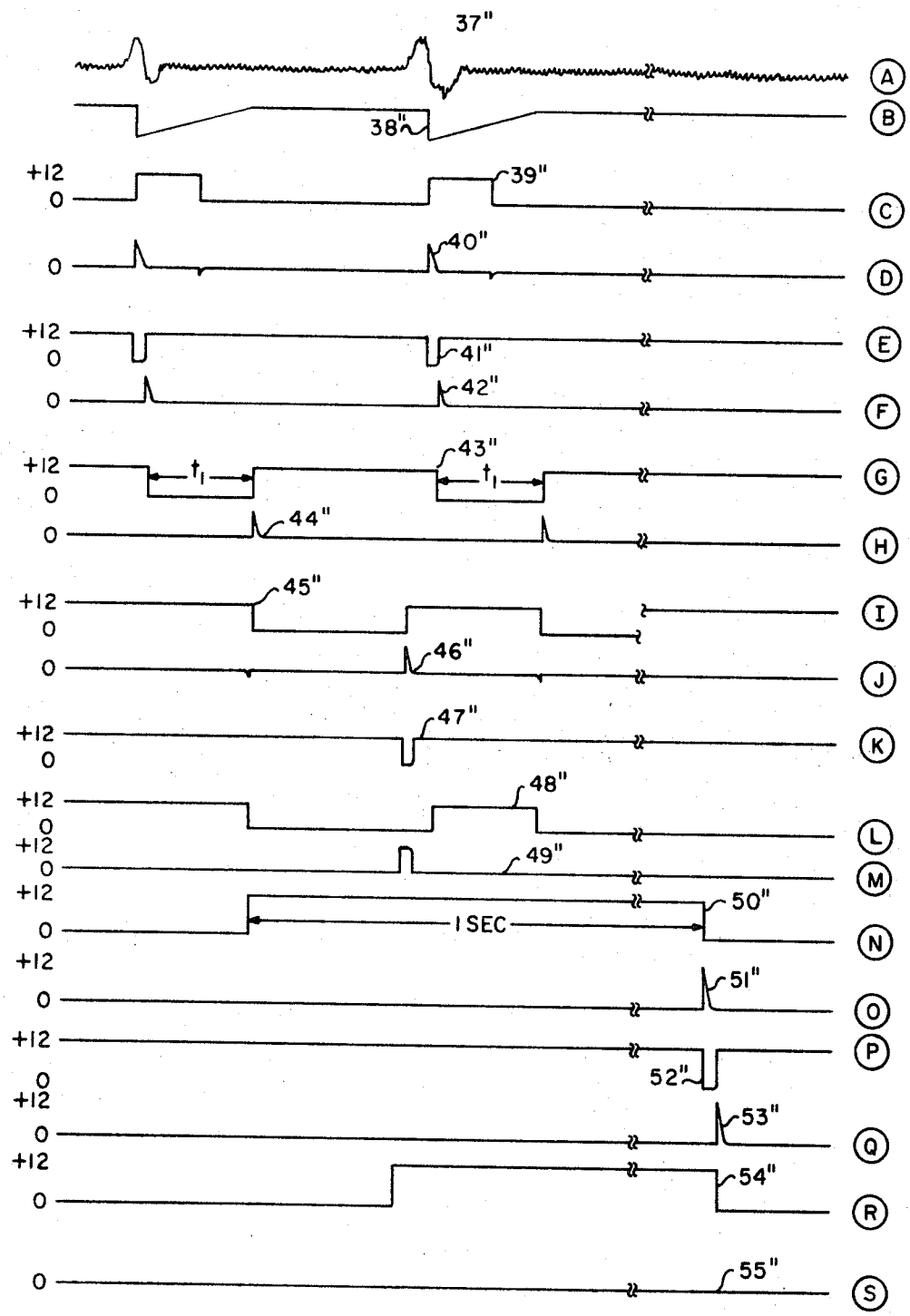
FIG. 4 is a signal timing diagram for the system of FIG. 1 in which the signals received lie below the lower frequency limit of the selected band.

In order to more clearly illustrate and explain the operation of the signal receiving and detection system of FIG. 1, reference is now had to FIGS. 2, 3, and 4 of the accompanying drawings which illustrate signal timing diagrams for the system of FIG. 1.

In FIG. 2 the electrical analog signal 37 is developed at the output of microphone 10 in response to a received acoustic signal which lies within the selected frequency band. This signal is amplified by preamplifier 12, linear amplifier 13 and AGC amplifier 14. The amplified signal is peak detected in unit 15, producing signal 38 of FIG. 2. The output of peak detector 15 is applied to the differential amplifier 16 and if the peaks of the signal 38 exceed a threshold level set by threshold adjuster 17, the differential amplifier, which acts as a one-shot circuit, will generate a pulse for each such signal peak, thus producing signal 39 of FIG. 2. Thus, the analog signal 37 at point A in FIG. 1 is converted to the digital signal 39 of FIG. 2 at point C in FIG. 1.

Signal 39 is differentiated by positive differentiator 20 to produce signal 40 of FIG. 2 at point D which is inverted by inverter 21 to produce signal 41 at FIG. 2 at point E. Signal 41 is differentiated by positive differentiator 22 to produce signal 42 of FIG. 2, which is the input signal to one-shot circuit 23. Each spike of signal 42 triggers the one-shot circuit 23 to produce the gating signal 43 of FIG. 2 at point G having a gating interval "$t_1$." Signal 41 and signal 43 are coupled to the NAND gate 24, and as long as no pulse of signal 41 falls within the first gating interval of signal 43, no output signal will be produced by the NAND gate 24 as shown in signal 49 of FIG. 2.

Signal 43 is differentiated by positive differentiator 25 to produce signal 44 of FIG. 2, which is the normal input to the second one-shot circuit 26. Signal 42 is coupled to the reset input of second one-shot circuit 26. At the end of the first gating interval of signal 43, the first spike of signal 44 triggers the second one-shot circuit 26 to generate the second gating signal 45 of FIG. 2 at point I in FIG. 1. This second gating signal 45 may extend for a predetermined duration "$t_2$" indicated by the dotted lines in FIG. 2, or it may be cut short by the second spike of signal 42 which resets second one-shot circuit 26. This latter effect is indicated by the solid line in signal 45 of FIG. 2. Signal 45 is then differentiated by positive differentiator 28 to produce signal 46 of FIG. 2 which is inverted by inverter 29 to produce signal 47 of FIG. 2 at one terminal of NAND gate 30.

Signal 40 and signal 44 are fed to flip-flop 27. The first spike of signal 44 sets the flip-flop 27 and the second spike of signal 40 resets flip-flop 27 so as to produce output signal 48 of FIG. 2 at point L, which is coupled to the other terminal of NAND gate 30. Since the negative pulse of signal 47 falls outside the negative pulse generated by signal 48 there will be no output signal from NAND gate 30 as shown in signal 49 of FIG. 2. Signal 42 is coupled to the set terminal of flip-flop 32 and the first spike of signal 42 will set the flip-flop and produce signal 50 of FIG. 2 at point N. Signal 50 is then coupled to process timer 33 which produces, at the end of a 1 second sampling interval, signal 51 which resets flip-flop 32 and which is inverted by inverter 34 to produce signal 52 of FIG. 2 at point P. Signal 52 is the sampling signal which is generated at the completion of each one second sampling interval.

Signal 52 is coupled to positive differentiator 37 to produce the spike of signal 53 of FIG. 2 at point Q, which resets the flip-flop 35. Signal 52 is also fed to one terminal of NAND gate 36. Since no output signal is generated by OR gate 31 when all the detected acoustic signals lie within the selected frequency band during the sampling interval, no signal will be coupled to the inhibit terminal of NAND gate 36. The NAND gate will therefore produce output signal 55 of FIG. 2 at point S in response to signal 52 indicating the receipt of acoustic signals, during the one second sampling interval, which lie within the selected frequency band being monitored.

Referring now to FIG. 3, there is illustrated an acoustic signal 37' whose frequency lies above the upper limit of the selected frequency band. This signal is processed through units 12–17, 20 and 21 to produce the signals 38', 39', 40' and 41' in the same manner as previously described with respect to the acoustic signal 37 of FIG. 2. At the input to one-shot circuit 23, the first spike of signal 42' triggers the one-shot circuit and produces the first gating interval "$t_1$" in the signal 43' of FIG. 3. The third pulse of signal 42' will also trigger the one-shot to produce a second gating interval in signal 43'. The second spike in signal 42' has no effect upon the one-shot circuit since it falls within the first gating interval triggered by the first spike of signal 42'. Since the second pulse of signal 41' falls within the first gating interval of signal 43', NAND gate 24 will produce signal 49' of FIG. 3. The remaining processing of signals 44' – 48' of FIG. 3 through units 25–30 is the same as has already been described in reference to FIG. 2.

The pulse of signal 49' sets flip-flop 35 which is reset by the spike of signal 53' thereby producing the output signal 54' of FIG. 3. The generation of signals 50' – 52' is identical to the description with reference to signals 50–52 of FIG. 2. Since signal 54' appears at point R and is coupled to the inhibit terminal of gate 36, the NAND gate will not be responsive to the pulse of signal 52' at the end of the one second sampling interval. Thus, no output signal 55' will be generated as shown in FIG. 3, thereby indicating the detection of acoustic signals lying outside the selected frequency band during the sampling interval.

In FIG. 4 is illustrated an acoustic signal 37" whose frequency lies below that of the selected band. Signals 38" – 42" are generated and processed in the same manner as previously described with reference to the corresponding signals of FIGS. 2 and 3. The two spikes of signal 42", which is the input to first one-shot circuit 23, trigger the gating intervals of gating signal 43" as in the description with reference to FIG. 1. Similarly, the two spikes of signal 44" trigger the second one-shot circuit 26 to produce the two gating intervals of signal 45" shown in FIG. 4. It should be noted that the first gating interval of signal 45" is not cut short as was the case with the signal 45 of FIG. 2, since the second of the pair of spikes of signal 42" falls outside the duration of the first gating interval of signal 45". Signal 45" is differentiated by positive differentiator 28 to produce signal 46" which is then inverted by inverter 29 to produce signal 47" of FIG. 4. Flip-flop 27 is set by the first pulse of signal 44", reset by the second pulse of signal 40" and then set again by the second pulse of signal 44" to produce signal 48" of FIG. 4. Since the pulse of signal 47" occurs within the first negative going pulse of signal 48", NAND gate 30 will produce at point M in FIG. 1 the output signal 49".

Generation of signals 50" – 53" is the same as described with reference to the corresponding signals of FIGS. 2 and 3. Flip-flop 35 will be set by the pulse of signal 49" and then reset by the spike of signal 53" so as to produce output signal 54" of FIG. 4. As described with reference to FIG. 3, signal 54" will inhibit the NAND gate 36 from producing an output signal in response to the sampling signal 52". Thus no output signal 55" will be generated as shown in FIG. 4, indicating the receipt of acoustic signals lying outside the selected band during the sampling interval.

From the above description it will be seen that the acoustic signal receiving and detecting system of FIG. 1 will respond only to acoustic signals, such as signal 37 of FIG. 2, which do not exceed the predetermined upper and lower limits of the selected frequency band during each one second sampling interval. When acoustic signals such as 37' and 37" shown in FIGS. 3 and 4, respectively, are received, no output signal will be generated by unit 19 of FIG. 1, since these signals exceed the aforementioned upper and lower frequency limits. Reliable detection is thus achieved in a particularly simple manner.

While there has been described what is at present considered to be the preferred embodiment of this invention, it will be obvious to those skilled in the art that various changes and modifications may be made therein without departing from the invention.

What is claimed is:

1. A system for receiving and detecting propagated mechanical-wave analog signals lying within a selected band of frequencies, comprising:

transducer means for receiving mechanical-wave analog signals and converting said signals into an electrical analog signal representative of said mechanical signals;

means for converting said electrical analog signal to a digital signal, the spacing between successive pulses in said digital signal being proportional to the corresponding instantaneous frequency of said received mechanical-wave signals;

and digital signal processing means, for examining the pulse-spacing of successive pulses of said digital signal during periodic sampling intervals and for generating an output signal at the completion of each sampling interval only if the pulse-spacing of successive pulses of said digital signal has not exceeded predetermined upper and lower spacing limits during said sampling interval, said upper and lower spacing limits corresponding to the upper and lower frequency limits of said selected band comprising:

comparison means comprising a first one-shot circuit responsive to the pulses of said digital signal for generating a first gating signal of a predetermined duration corresponding to said upper pulse-spacing limit and a second one-shot circuit responsive to said first gating signal for generating a second gating signal of a predetermined duration corresponding to said lower pulse-spacing limit, in combination with first and second coincidence circuits respectively, said first coincidence circuit being responsive to both said digital signal and said first gating signal and said second coincidence circuit being responsive to both said first gating signal and said second gating signal so that a first signal is generated whenever the second of a pair of successive pulses of said digital signal falls within the duration of said first gating signal and a second signal is generated whenever the second of a pair of successive pulses falls outside the combined duration of said first and second gating signals;

and further comprising indicating means, responsive to said first and second signals during said periodic sampling intervals, for generating an output signal indicating the receipt of mechanical-wave analog signals lying within said selected band during a sampling interval whenever no first or second signal is generated during the corresponding sampling interval.

2. A system in accordance with claim 1 wherein said mechanical wave signals are acoustical signals and said signal transducer is an acoustical-electrical transducer for receiving said acoustic signals.

3. A system for receiving and detecting propagated mechanical wave analog signals lying within a selected band of frequencies, comprising:

transducer means for receiving mechanical wave analog signals and converting said signals into an electrical analog signal representative of said mechanical signals;

analog-to-digital signal conversion means for converting said electrical analog signal into a digital signal representative of said analog signal, the pulse-spacing of successive pulses of said digital signal being proportional to the corresponding instantaneous frequency of the received mechanical wave signals;

and digital signal processing means, for examining the pulse-spacing of successive pulses of said digital signal during periodic sampling intervals and for generating an output signal at the completion of each sampling interval only if the pulse-spacing of successive pulses of said digital signal has not exceeded predetermined upper and lower spacing limits during said sampling interval, said upper and lower spacing limits corresponding to the upper and lower frequency limits of said selected band comprising:

comparison means comprising a first one-shot circuit responsive to the pulses of said digital signal for generating a first gating signal of a predetermined duration corresponding to said upper pulse-spacing limit and a second one-shot circuit responsive to said first gating signal for generating a second gating signal of a predetermined duration corresponding to said lower pulse-spacing limit, in combination with first and second coincidence circuits respectively, said first coincidence circuit being responsive to both said digital signal and said first gating signal and said second coincidence circuit being responsive to both said first gating signal and said second gating signal so that a first signal is generated whenever the second of a pair of successive pulses of said digital signal falls within the duration of said first gating signal and a second signal is generated whenever the second of a pair of successive pulses falls outside the combined duration of said first and second gating signals; and indicating means comprising means for generating a periodic sampling signal, and a NAND digital logic circuit, responsive to said sampling signal and said first and second signals which is inhibited from producing an output signal indicating the receipt of mechanical wave signals lying within said selected band whenever either of said first or second signals is generated during said sampling interval, said logic circuit producing an output signal in response to said sampling signal whenever no first or second signal is generated within said sampling interval.

4. In a system for receiving and detecting propagated mechanical-wave analog signals lying within a selected band of frequencies and wherein there is developed a digital signal in which the pulse-spacing of successive pulses is proportional to the corresponding instantaneous frequency of the received mechanical-wave signals, apparatus for processing said digital signal to detect the receipt of mechanical-wave signals lying within said selected frequency band, comprising:

comparison means for comparing the pulse spacing of successive pulses of said digital signal with predetermined upper and lower limits respectively, including a first one-shot circuit responsive to the pulses of said digital signal for generating a first gating signal of a predetermined duration corresponding to said upper pulse-spacing limit of a second one-shot circuit responsive to said first gating signal for generating a second gating signal of a predetermined duration corresponding to said lower pulse-spacing limit, in combination with first and second coincidence circuits respectively, said first coincidence circuit being responsive to both said digital signal and said first gating signal and said second coincidence circuit being responsive to both said first gating signal and said second gating signal so that a first signal is generated whenever the second of a pair of successive pulses of said digital signal falls within said duration of said first gating signal and a second signal is generated whenever the second of a pair of successive pulses falls outside the combined duration of said first and second gating signals;

and indicating means, responsive to said first and second signals during periodic sampling intervals, for comparing the pulse spacing of successive pulses of said digital signal with predetermined upper and lower limits respectively, including generating an output signal indicating the receipt of mechanical-wave analog signals lying within said selected band during a sampling interval whenever no first or second signal is generated during the corresponding sampling interval.

5. Signal processing apparatus as described in claim 4 wherein said indicating means includes means for generating a periodic sampling signal, and a NAND digital logic circuit, responsive to said sampling signal and to said first and second signals, which is inhibited from producing an output signal indicating the receipt of mechanical wave signals lying within said selected band whenever either of said first or second signals is generated during said sampling interval, said logic circuit producing an output signal in response to said sampling signal whenever no first or second signal is generated within said sampling interval.

6. Apparatus for processing a supplied digital signal for detecting successive pulses of said signal having a pulse repetition rate (PRR) lying within a selected PRR band, comprising:

comparison means for comparing the pulse spacing of successive pulses of said digital signal with predetermined upper and lower limits respectively, including a first one-shot circuit responsive to the pulses of said digital signal for generating a first gating signal of a predetermined duration corresponding to said upper pulse-spacing limit and a second one-shot circuit responsive to said first gating signal for generating a second gating signal of a predetermined duration corresponding to said lower pulse-spacing limit, in combination with first and second coincidence circuits respectively, said first coincidence circuit being responsive to both said digital signal and said first gating signal and said second coincidence circuit being responsive to both said first gating signal and said second gating signal so that a first signal is generated whenever the second of a pair of successive pulses of said digital signal falls within said duration of said first gating signal and a second signal is generated whenever the second of a pair of successive pulses falls outside the combined duration of said first and second gating signals;

and indicating means, responsive to said first and second signals during periodic sampling intervals, for comparing the pulse spacing of successive pulses of said digital signal with predetermined upper and lower limits respectively, including generating an output signal indicating the receipt of mechanical-wave analog signals lying within said selected band during a sampling interval whenever no first or second signal is generated during the corresponding sampling interval.

* * * * *